United States Patent
Conner et al.

(10) Patent No.: US 9,822,265 B2
(45) Date of Patent: Nov. 21, 2017

(54) $CO_2$ ABATING LATEX COATING COMPOSITION

(71) Applicant: Rohm and Haas Company, Philadelphia, PA (US)

(72) Inventors: David Conner, Dresher, PA (US); Gary W. Dombrowski, Chester Springs, PA (US); Alvin M. Maurice, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 100 days.

(21) Appl. No.: 15/131,622

(22) Filed: Apr. 18, 2016

(65) Prior Publication Data

US 2016/0312045 A1    Oct. 27, 2016

Related U.S. Application Data

(60) Provisional application No. 62/150,557, filed on Apr. 21, 2015.

(51) Int. Cl.
| | |
|---|---|
| *C09D 7/12* | (2006.01) |
| *C08F 220/14* | (2006.01) |
| *C08L 33/14* | (2006.01) |
| *B01J 41/14* | (2006.01) |
| *C09D 5/02* | (2006.01) |
| *C09D 133/12* | (2006.01) |

(52) U.S. Cl.
CPC .............. *C09D 7/125* (2013.01); *B01J 41/14* (2013.01); *C08F 220/14* (2013.01); *C08L 33/14* (2013.01); *C09D 5/024* (2013.01); *C09D 133/12* (2013.01)

(58) Field of Classification Search
CPC ...... C09D 5/024; C09D 7/125; C09D 133/12; B01J 41/14; C08F 220/14; C08L 33/14
USPC ........................................................ 523/310
See application file for complete search history.

(56) References Cited

U.S. PATENT DOCUMENTS

| | | | |
|---|---|---|---|
| 8,609,762 B2 | 12/2013 | Killilea et al. | |
| 2012/0277334 A1* | 11/2012 | Zhang | C09D 5/002 521/28 |

OTHER PUBLICATIONS

Kebede Beshah & Wayne Devonport in Journal Coatings Technology Research, 10(6), 821-828, 2013.

* cited by examiner

*Primary Examiner* — Edward Cain
(74) *Attorney, Agent, or Firm* — Reid S. Willis

(57) ABSTRACT

The present invention relates to a composition, an aqueous dispersion of polymer particles functionalized with acetoacetoxyethyl groups and a $CO_2$ abating additive, an ion exchange resin functionalized with amine groups or quaternary ammonium salt groups or a combination thereof. The composition is useful for $CO_2$ abatement in acetoacetoxy functionalized latexes compositions.

10 Claims, No Drawings

$CO_2$ ABATING LATEX COATING COMPOSITION

BACKGROUND OF THE INVENTION

The present invention relates to a $CO_2$ abating latex coating composition, more particularly, a latex coating composition comprising polymer particles functionalized with acetoacetoxyethyl groups. Post film-forming curing of latex films is desirable to achieve improved hardness, as well as chemical-, scrub-, dirt-pickup-, and print resistance in the final coating. To that end, the use of polymeric binder particles functionalized with acetoacetoxyethyl methacrylate (AAEM) has been a mainstay for ambient cure of architectural coatings. AAEM has relatively low toxicity and undergoes oxidative and reacting crosslinking efficiently to provide an excellent balance of properties in the final coating.

But this favorable outcome comes with an undesired side effect: The reactive acetoacetoxy groups hydrolyze during latex storage to liberate carbon dioxide, thereby causing undesirable and potentially catastrophic pressure buildup within the storage vessel. This pressure buildup can be mitigated using ammonia but it too has its drawbacks: Ammonia imparts a strong odor and often causes yellowing in the final coating; moreover, formulators face ever-increasing regulatory pressure to remove ammonia and other volatile amines from their paint formulations. It has also been found that ammonia, which is thought to stabilize AAEM in the enamine form, does not actually prevent the formation of $CO_2$. (*J. Coat. Technol. Res.*, 10(6), 821-828, 2013). Accordingly, it would be desirable to find an economically feasible low VOC alternative for preparing a shelf-stable self-curing coating composition.

SUMMARY OF THE INVENTION

The present invention addresses a need by providing, in a first aspect, a composition comprising a) an aqueous dispersion of acrylic-based polymer particles functionalized with from 1 to 20 weight percent structural units of an acetoacetoxy functionalized monomer, based on the weight of the polymer particles; and b) an ion exchange resin functionalized with amine groups or quaternary ammonium salt groups 45 or a combination thereof; wherein the composition comprises a substantial absence of ammonium cation; and the ratio of amine or quaternary ammonium salt groups of the ion exchange resin to structural units of the acetoacetoxy functionalized monomer is from 10 to 500 meq/mole of ion exchange resin per mole of structural units of the acetoacetoxy functionalized monomer. The composition of the present invention is effective for abating $CO_2$ in latex compositions functionalized with structural units of an acetoacetoxy containing monomer such as AAEM.

In a second aspect, the present invention is a process for forming a $CO_2$-abating composition comprising the step of contacting an aqueous dispersion of acrylic-based polymer particles functionalized with 1 to 20 weight percent structural units of an acetoacetoxy functionalized monomer, based on the weight of the polymer particles, with an ion exchange resin functionalized with amine groups or quaternary ammonium salt groups or a combination thereof; wherein the ratio of amine or quaternary ammonium salt groups of the ion exchange resin to structural units of the acetoacetoxy functionalized monomer is from 10 to 500 meq/mol of ion exchange resin per mole of structural units of the acetoacetoxy functionalized monomer, wherein substantially no ammonia or a generator of ammonia is added in the step.

DETAILED DESCRIPTION OF THE INVENTION

In a first aspect, the present invention is a composition comprising a) an aqueous dispersion of acrylic-based polymer particles functionalized with from 1 to 20 weight percent structural units of an acetoacetoxy functionalized monomer, based on the weight of the polymer particles; and b) an ion exchange resin functionalized with amine groups or quaternary ammonium salt groups or a combination thereof; wherein the composition comprises a substantial absence of ammonium cation; and the ratio of amine or quaternary ammonium salt groups of the ion exchange resin to structural units of the acetoacetoxy functionalized monomer is from 10 to 500 meq/mole of ion exchange resin per mole of structural units of the acetoacetoxy functionalized monomer. The composition of the present invention is effective for abating $CO_2$ in latex compositions functionalized with structural units of an acetoacetoxy containing monomer such as AAEM.

As used herein, the term "structural unit" of the named monomer refers to the remnant of the monomer after polymerization. For example, a structural unit of methyl methacrylate is illustrated:

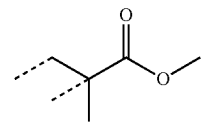

structural unit of methyl methacrylate where the dotted lines represent the points of attachment of the structural unit to the polymer backbone. Similarly, a structural unit of acetoacetoxyethyl methacrylate is represented as follows:

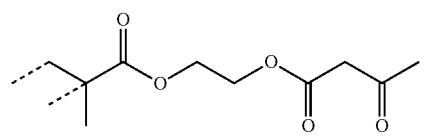

structural unit of AAEM

The term "acrylic-based polymer particles" is used herein to refer to polymer particles that comprise at least 30 weight percent, based on the weight of the polymer particles, structural units of one or more methacrylate monomers such as methyl methacrylate and ethyl methacrylate, and/or one or more acrylate monomers such as ethyl acrylate, butyl acrylate, 2-propylheptyl acrylate, and 2-ethylhexyl acrylate. The acrylic-based polymers may also include structural units of other non-acrylate or methacrylate monomers such as styrene, sulfur acid monomers such as 4-vinylbenzenesulfonic acid or a salt thereof, and phosphorus acid monomers such as phosphoethyl methacrylate or a salt thereof.

As used herein, an acetoacetoxy functionalized monomer is a monomer capable of copolymerizing with an acrylate or methacrylate under emulsion polymerization conditions to form a copolymer comprising acetoacetoxy functionality.

Preferred acetoacetoxy functionalized monomers are acetoacetoxyalkyl acrylates, methacrylates, and acrylamides, examples of which include AAEM, acetoacetoxyethyl acrylate, acetoacetoxyethyl acrylamide, acetoacetoxyethyl methacrylamide, acetoacetoxypropyl acrylate, acetoacetoxypropyl methacrylate, acetoacetoxybutyl acrylate, and acetoacetoxybutyl methacrylate, with AAEM being preferred. Preferably, the aqueous dispersion of acrylic based polymer particles comprises from 1 to 15, more preferably from 1 to 10 weight percent structural units of an acetoacetoxy functionalized monomer, more preferably AAEM.

The ion exchange resin may be microporous (a gel resin) or macroporous (a macroreticular resin), and can be combined with the latex as a powder or as an aqueous dispersion. The ion exchange resin is preferably a strong base microporous anion exchange resin, an example of which is a divinylbenzene crosslinked polystyrene resin functionalized with a quaternary ammonium salt. This preferred functionalization can be accomplished by way of chloromethylation of the crosslinked polystyrene resins followed by amination with a tertiary amine such as trimethylamine. Commercial examples of strong base anionic exchange resins include DOWEX™ 1×2 CL16-100 Ion Exchange Resin and DUO-LITE™ AP143/1073 Cholestyramine Resin (Trademarks of the Dow Chemical Company or Its Affiliates).

It is also possible to use a macroporous ion exchange resin functionalized with primary, secondary, or tertiary amine groups. A commercial example of a suitable macroporous primary amine functionalized ion exchange resin is Lewatit VP OC 1065 Resin, which is a macroreticular divinylbenzene crosslinked polystyrene resin with benzyl-amine groups situated throughout the porous surfaces of the resin particles.

Preferably, the ratio of amine or quaternary ammonium salt groups of the ion exchange resin to structural units of the acetoacetoxy functionalized monomer is in the range of from 20, more preferably from 40 meq/mole, to 200, more preferably to 100 meq/mole of ion exchange resin per mole of structural units of the acetoacetoxy functionalized monomer. The concentration of amine or quaternary ammonium salt groups in the dry ion exchange resin (also known as the weight exchange capacity) can be determined by any suitable method such as described in ASTM D2187-94, Standard Test Methods for Physical and Chemical Properties of Particulate Ion-Exchange Resins.

The aqueous dispersion of the acetoacetoxy functionalized copolymer particles (the latex) are advantageously blended with the ion exchange resin to form the composition of the present invention. The pH of the composition is preferably greater than 7.0, more preferably at least 7.5, and most preferably at least 8.0.

The composition of the present invention contains a substantial absence of ammonium cation, which means that the composition comprises less than that concentration of ammonium cation, arising from the addition of ammonia or a generator of ammonia (for example, $NH_4OH$ or $NH_4HCO_3$), that would be required to bring the pH of the composition to greater than 7, more preferably to greater than 6, in the absence of the amine compound. More preferably, the composition comprises not greater than 0.1, more preferably not greater than 0.01, more preferably not greater than 0.001, and most preferably 0 moles of ammonium cation per mole of structural units of the acetoacetoxy monomer.

In a second aspect, the present invention is a process for forming a $CO_2$-abating composition comprising the step of contacting an aqueous dispersion of acrylic-based polymer particles comprising 1 to 20 weight percent structural units of an acetoacetoxy functionalized monomer, based on the weight of the polymer particles with ion exchange resin functionalized with amine groups or quaternary ammonium salt groups or a combination thereof; wherein the ratio of amine or quaternary ammonium salt groups of the ion exchange resin to structural units of the acetoacetoxy functionalized monomer is from 10 to 500 meq/mol of ion exchange resin per mole of structural units of the acetoacetoxy functionalized monomer, wherein substantially no ammonia or a generator of ammonia is added in the step. As used herein "substantially no ammonia or generator of ammonia" means that the amount of ammonia or generator of ammonia (e.g., $NH_4OH$ or $NH_4HCO_3$) that is added is less than the amount that would be required to bring the pH of the composition to greater than 7, more preferably to greater than 6, in the absence of the amine compound. Preferably, not greater than 0.1, more preferably not greater than 0.01, more preferably not greater than 0.001, and most preferably 0 moles of ammonia or generator of ammonia is added per mole of structural units of the acetoacetoxy monomer.

The composition of the present invention is useful in coatings formulations and is advantageously combined with one or more of the following materials: pigments, such as $TiO_2$ and opaque polymers; defoamers; surfactants; dispersants; rheology modifiers; coalescents; and neutralizing agents.

EXAMPLES

Intermediate 1(Comp. 1)—Synthesis of AAEM-Containing Binder

A first monomer emulsion (ME1) was prepared by first mixing together deionized water (144.6 g), RHODAFAC™ RS-610/A25 surfactant (34.9 g), and Polystep B-11 surfactant (5.8 g), then admixing, in the following order, butyl acrylate (349.0 g), methyl methacrylate (419.9 g), allyl methacrylate (4.2 g), and methacrylic acid (3.9 g). A second monomer emulsion (ME2) was prepared by mixing deionized water (304.9 g) with RHODAFAC RS-610/A25 (99.3 g), then admixing, in the following order, butyl acrylate (407.2 g), methyl methacrylate (633.6 g), AAEM (87.3 g), and methacrylic acid (35.1 g).

To a 5-L, four-necked round bottom reactor equipped with a paddle stirrer, a thermometer, nitrogen inlet, and a reflux condenser was added deionized water (1300.0 g) and Polystep B-11 surfactant (0.8 g). The contents of the reactor were heated to 85° C. under $N_2$ and stirring was initiated. A reactor inhibitor solution was added to the reactor followed by addition of a portion of ME1 (97.0 g), then by a solution of sodium persulfate (3.8 g) dissolved in deionized water (20 g). After the initial exotherm, the reactor temperature was held at 85° C. for the remainder of the monomer emulsion feeds.

A co-feed solution of sodium persulfate (1.8 g) in deionized water (105.0 g) was fed to the flask over a period of 125 min. After onset of addition of the co-feed, the remainder of ME1 was fed to the reactor over 50 min. Upon completion of addition of ME1, a 45-mL rinse was added to the reactor and the reaction was held at 85° C. for 5 min.

After the 5-min hold, ME2 was fed to the reactor over 70 min, after which time a 30-mL rinse was added to the reactor. The reaction was maintained at 85° C. for 10 min hold before cooling to 65° C. A promoter solution of ferrous sulfate heptahydrate (0.011 g) in water (20 mL) was prepared and added to the reactor. A solution of 70% aqueous t-butyl hydroperoxide (0.84 g) and deionized water (21.1 mL); and a solution of isoascorbic acid (0.64 g) in water (21.3 mL) were fed separately and concurrently to the reactor over 30 min to chase residual monomers.

The reactor was cooled during which time a 10% aqueous solution of potassium carbonate (113 g) was added to the reactor over a period of 3 min. ROCIMA™ BT2S biocide (A Trademark of The Dow Chemical Company or Its Affiliates, 10.3 g) in water (20 mL) was added to the reactor when the reactor temperature dropped below 30° C. The resulting dispersion was filtered through a 325 mesh screen after the contents were cooled to room temperature. The solids content was found to be 44.7%.

Preparation of Ion Exchange Resin

DOWEX™ 1×2 CL16-100 Ion Exchange Resin, a crosslinked styrene:divinyl benzene copolymer (98.5:1.5 w/w %) containing about 1 quaternary ammonium chloride group per benzene nucleus, was used as the ion exchange resin. The resin was ground as follows: To the anion exchange resin (200 g) was added water (250 g) to adjust the polymer solids to 15-20% w/w. This mix was ground for 3 h on a Red Devil Paint Conditioner Model #5410-00 (Union, N.J.) using 0.5 inch (~1.2 cm) zirconia media to obtain a weight average particle size of approximately 5 μm as measured on a Mastersizer 2000 Particle Size Analyzer (Malvern Instruments Ltd., Malvern, UK). A broad particle size distribution of about 1 μm to 40 μm was obtained.

Heat Age Testing

A portion of the binder of Intermediate 1 (4000 g) was combined with the ground ion exchange resin slurry (53.9 g) in a 1-qt paint can and mixed until thoroughly dispersed. The can was then inverted and accelerated heat aging was conducted in an oven at 60° C. for 14 d. The can was removed from the oven and then immediately evaluated for signs of pressure build and again after cooling to room temperature. A "pass" for this test indicated that no significant pressure build was observed at elevated or room temperature and that the latex was stable (i.e., did not coagulate for change pH or particle size significantly during the accelerated aging). The binder was also tested for minimum film formation temperature (MFFT) to ensure that any pre-crosslinking that may have occurred did not hinder film formation. Table 1 shows the effect of no additive (Comp. 1) as well as the effect of the ground ion exchange resin (CL-16-100) on pressure buildup (Example 1). $MFFT_o$ refers to the initial minimum film formation temperature prior to heat aging.

TABLE 1

Effect of Base Additive on Gassing

| Ex. No. | Additive | (% binder solids) | Gassing | $MFFT_o$ | MFFT after 14 d, 60° C. |
|---|---|---|---|---|---|
| Comp. 1 | None | 0 | Failure | 23° C. | NA |
| 1 | CL16-100 | 1.1 | Pass | 23° C. | 25° C. |

The data shows that a crosslinked ion exchange resin functionalized with a quaternary ammonium salt controls pressure building in a paint can. In the absence of the ion exchange resin, unacceptable pressure buildup occurs.

For Example 1, the MFFT after heat age testing was substantially the same as the $MFFT_o$ for Comp. 1 and Example 1, which shows that the additive does not adversely impact film formation. It has further been discovered that coatings formulations prepared using the composition of the present invention maintain acceptable performance in the substantial absence of an ammonia neutralizer, preferably in the total absence of an ammonia neutralizer.

The invention claimed is:

1. A composition comprising a) an aqueous dispersion of acrylic-based polymer particles functionalized with from 1 to 20 weight percent structural units of an acetoacetoxy functionalized monomer, based on the weight of the polymer particles; and b) an ion exchange resin functionalized with amine groups or quaternary ammonium salt groups or a combination thereof; wherein the composition comprises a substantial absence of ammonium cation; and the ratio of amine or quaternary ammonium salt groups of the ion exchange resin to structural units of the acetoacetoxy functionalized monomer is from 10 to 500 meq/mole of ion exchange resin per mole of structural units of the acetoacetoxy functionalized monomer.

2. The composition of claim 1 wherein the ion exchange resin is functionalized with quaternary ammonium salt groups.

3. The composition of claim 1 wherein the ion exchange resin is functionalized with primary, secondary, or tertiary amine groups or a combination thereof.

4. The composition of claim 3 wherein the acetoacetoxy functionalized monomer is an acetoacetoxy-$C_1$-$C_4$-alkyl acrylate, an acetoacetoxy-$C_1$-$C_4$-alkyl methacrylate, or an acetoacetoxy-$C_1$-$C_4$-alkyl acrylamide.

5. The composition of claim 4 wherein the acetoacetoxy functionalized monomer is acetoacetoxyethyl methacrylate, acetoacetoxyethyl acrylate, acetoacetoxyethyl acrylamide, acetoacetoxyethyl methacrylamide, acetoacetoxypropyl acrylate, acetoacetoxypropyl methacrylate, acetoacetoxybutyl acrylate, or acetoacetoxybutyl methacrylate.

6. The composition of claim 2 which comprises not greater than 0.1 mole of ammonium cation per mole of structural units of the acetoacetoxy monomer, wherein the acrylic-based polymer particles comprise from 1 to 10 weight percent structural units of the acetoacetoxy functionalized monomer; the ratio of amine or quaternary ammonium salt groups to structural units of the acetoacetoxy functionalized monomer is from 20 to 200 meq/mole of ion exchange resin per mole of structural units of the acetoacetoxy functionalized monomer; and the pH of the composition is greater than 7.0.

7. The composition of claim 6 which comprises not greater than 0.01 mole of ammonium cation per mole of structural units of the acetoacetoxy monomer, wherein the acetoacetoxy functionalized monomer is acetoacetoxyethyl methacrylate; the ratio of amine or quaternary ammonium salt groups to structural units of acetoacetoxyethyl methacrylate is from 40 to 100 meq/mole of ion exchange resin per mole of structural units of the acetoacetoxy functionalized monomer and the pH of the composition is at least 7.5.

8. The composition of claim 7 which comprises not greater than 0.001 mole of ammonium cation per mole of structural units of acetoacetoxyethyl methacrylate.

9. The composition of claim 1 which further includes one or more materials selected from the group consisting of pigments; defoamers; surfactants; dispersants; rheology modifiers; coalescents; and neutralizing agents.

10. A process for forming a $CO_2$-abating composition comprising the step of contacting an aqueous dispersion of acrylic-based polymer particles functionalized with 1 to 20 weight percent structural units of an acetoacetoxy functionalized monomer, based on the weight of the polymer particles, with an ion exchange resin functionalized with amine groups or quaternary ammonium salt groups or a combination thereof; wherein the ratio of amine or quaternary ammonium salt groups of the ion exchange resin to structural units of the acetoacetoxy functionalized monomer is from 10 to 500 meq/mol of ion exchange resin per mole of structural units of the acetoacetoxy functionalized monomer, wherein substantially no ammonia or a generator of ammonia is added in the step.

* * * * *